March 11, 1947.  A. WOLF  2,417,227
SCANNING DEVICE
Filed Dec. 24, 1943  2 Sheets-Sheet 1

INVENTOR.
ALEXANDER WOLF
BY
R. J. Dearborn
ATTORNEY

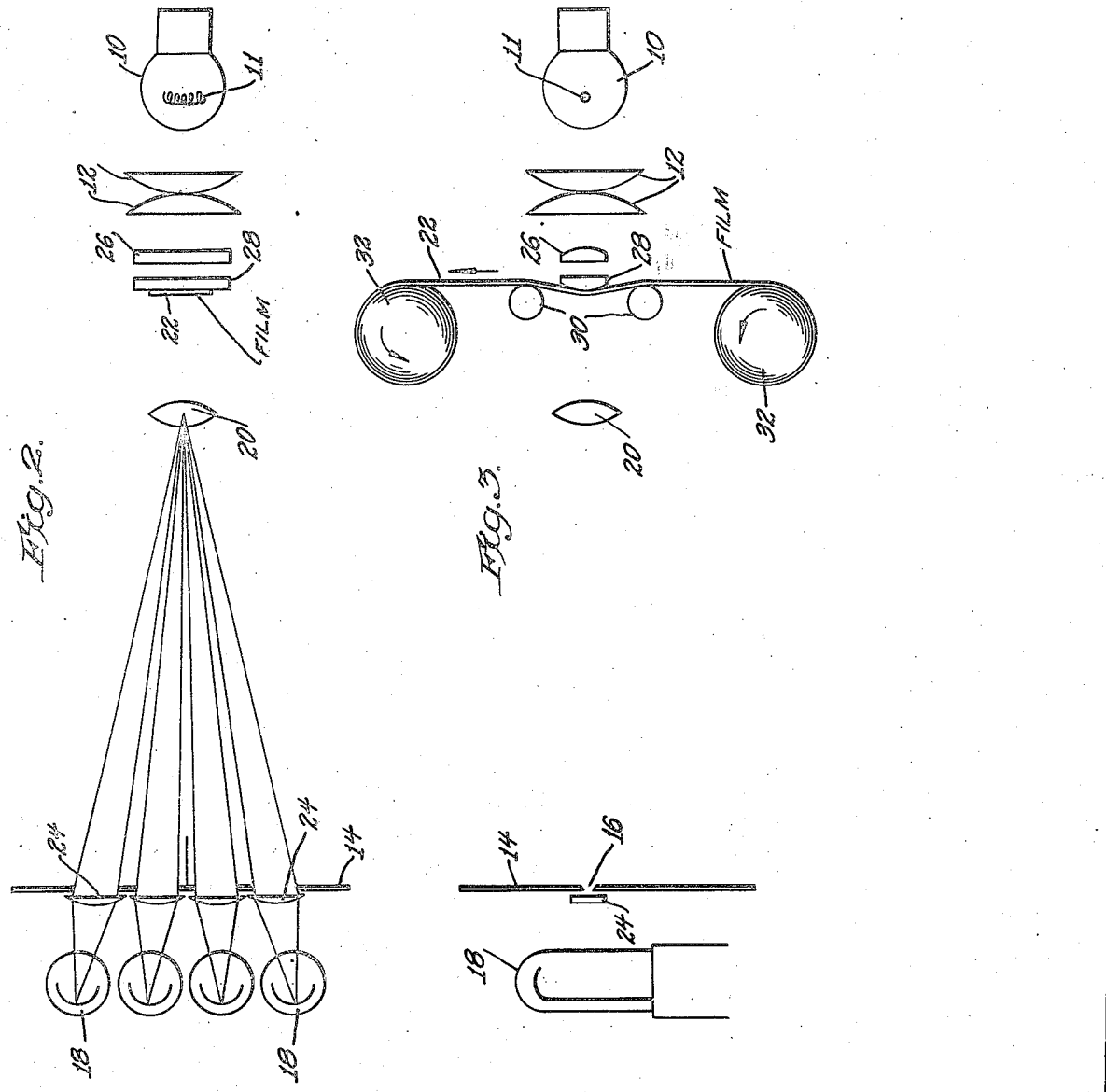

Patented Mar. 11, 1947

2,417,227

UNITED STATES PATENT OFFICE 2,417,227

SCANNING DEVICE

Alexander Wolf, Houston, Tex., assignor to The Texas Company, New York, N. Y., a corporation of Delaware Application December 24, 1943, Serial No. 515,485

3 Claims. (Cl. 179—100.3)

1

This invention relates to an optical system and more particularly to an apparatus for scanning a moving film strip containing one or more parallel tracks and converting variations in density or width of the tracks into corresponding variations in an electric current.

The principal object of the invention is to provide an optical system or device whereby a light beam passing through several closely adjacent tracks on a film strip can be split up and that portion of the beam passing each of the tracks directed to a separate or a unitary light-responsive device such as a photoelectric cell without the necessity of crowding the elements of the apparatus together or of using undesirably small light-sensitive cells.

In the motion picture industry it is customary to record sound on film by means of a so-called "sound track" on which the wave form of the sound is reproduced in the form of an exposed or opaque line or area on a longitudinally moving film strip, the width of the track corresponding to the instantaneous amplitude of the sound. The track may, on the other hand, be of uniform width but of varying density or opacity. These so-called sound tracks are also used in other industries where it is desired to record in parallel lines on a moving film the varying output of one or more instruments. The number of tracks may vary from one to as many as 25 or even more on a single 35 mm. film strip.

After the film record has been made it is usually desirable to convert one or all of the tracks on the film strip into a corresponding number of electric currents, each current varying in amplitude in accordance with the width or the density of the track at any particular moment. When there are more than, say, two tracks on the film strip to be scanned it is frequently difficult, if not impossible, to arrange an optical system so that a beam of light will pass through, or around, each of the tracks to the target of a separate light-responsive device such as a photoelectric cell so that the amount of light impinging upon the cell will vary in accordance with the width or density of the track since, even though the photoelectric cells are arranged closely together, the over-all width of the series of cells is greater than the width or spread of the light beam.

In accordance with the invention an optical system or arrangement has been provided in which the light from a single lamp filament is converged through the moving film strip onto an objective lens. Light-responsive devices or cells are arranged in a plane substantially perpendicular to the light beam, and between the light cells and the objective lens is placed a mask having slits disposed so that there will be one slit in line with the objective lens and each light cell. In back of the mask and opposite each

2 slit a converging lens is mounted and the distances are preferably chosen so that the objective lens and one light cell will be positioned at conjugate foci of each converging lens. By means of this arrangement a portion of the light beam passing each track on the film is directed by means of the objective lens to one of the slits in the mask. In other words, the objective lens forms a real image of the record tracks in the plane of the mask containing the slits and each of the converging lenses focuses the image of the objective lens 20 onto one of the light cells. With this arrangement, the series of light cells can be spread out so that there is no crowding and, as stated above, as many as 25 or more cells can be arranged to respond to the variations in width or density of as many tracks on a single film strip with the use of but one lamp as a light source.

For a better understanding of the invention, reference may be had to the accompanying drawing in which Figure 1 is a schematic representation of a more or less conventional scanning system or apparatus;

Figure 2 is a schematic representation, in plan, of a system embodying the invention in which four tracks on a moving film are scanned;

Figure 3 is an elevational view of the apparatus shown in Figure 2; and

Figure 1:
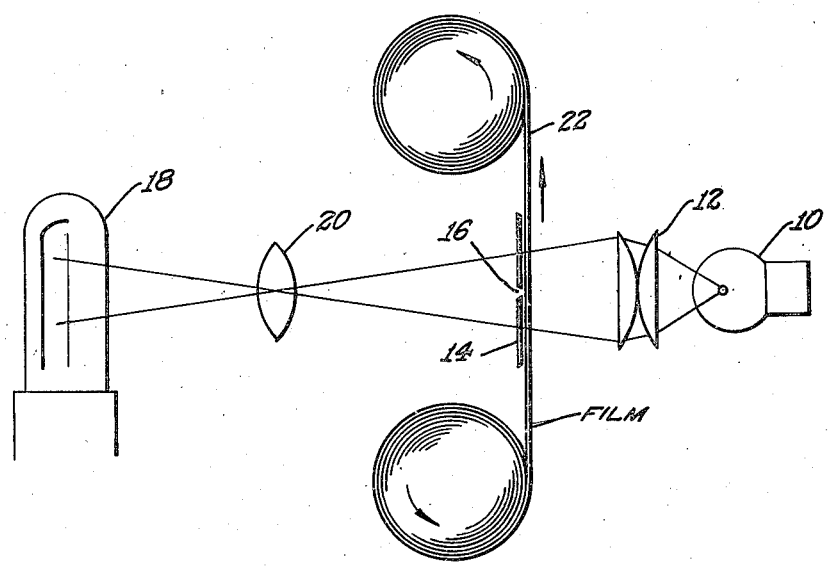
Figure 4:
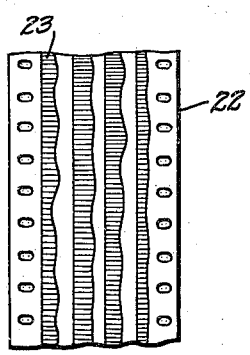
Figure 4 is a view of a small section of film strip containing four tracks of varying width.

As shown in Figure 1, a conventional sound track scanner consists of a lamp or light source 10, condensing lens 12, a mask 14 having a slit 16, and a light-responsive device such as a photoelectric cell 18. An auxiliary lens 20 which converges the light beam onto the photoelectric cell may also be inserted. This conventional arrangement suffers certain disadvantages in case it is desired to scan a film strip such as the strip 22 on which several tracks 23 have been recorded side by side; namely, the slit system must be very close to the film, which entails danger of scratching the film, and also requires that the slits be made very small. If it should be desired to change the size of the slits or their relative position a very fine mechanism must be constructed in a restricted space. The second difficulty arises from the fact that the beams of light passing through the various slits are not separated appreciably and hence there is difficulty in placing the photo cells in such a way that they will intercept the respective beams and yet not interfere with each other mechanically.

In the embodiment of the invention as shown in Figures 2 and 3, the difficulties enumerated above have been obviated. As shown in these figures, light from a lamp 10, preferably having a single elongated filament 11 is condensed by means of lens 12 so that it passes through a film strip 22 containing record tracks 23 and then to an objective lens 20, the lens 20 and lamp filament 11 being disposed at conjugate foci of the condensing lens 12. The function of the condensing lens 12 is to converge the light through the film on to the objective lens in a manner exactly analogous to the conventional scheme of a projection lantern. A mask 14 containing a plurality of transverse slits 16 is disposed so that the objective lens 20 will form a real image of the film 22 in the plane of the slits 16. Since this image may be larger than the track on the film, the slits are also larger and hence their construction is facilitated. Photoelectric cells 18 are placed in alignment with the objective lens 20 and the slits 16, and converging lenses 24 are mounted in the path of light emerging from the slits 16, the positioning of the photo cells 18 and the lenses 24 being such that the objective lens and one of the photo cells 18 are disposed at conjugate foci of the respective lens 24. With this arrangement it will be seen that any mechanism for changing the size of the slits 16 or displacing them relative to each other may be placed out in the open away from the restricted space near the film 22. Although the lenses 24 are shown as cylindrical, spherical lenses can also be used, if found desirable. Since any desired magnification can be readily obtained by means of the objective lens 20 the physical size of the photo cells 18 does not constitute a limitation. With the objective lens 20 and the photo cells 18 disposed at conjugate foci of the lenses 24, the same portion of the light-sensitive surface of each of the photo cells is illuminated at all times so that relative variations in the sensitivity of this surface do not introduce distortion into the output. This renders it unnecessary to interpose an etched or sand blasted surface into the light path in order to diffuse the light, thus avoiding the loss of light intensity which such a surface always entails.

A further improvement can be achieved by placing a convex cylindrical lens 26 in such a manner that light emerging from condensing lens 12 is focused into a straight line across the film since it is obviously unnecessary to illuminate portions of the film which will be cut out by the slits 16. For a given photo cell output the use of lens 26 permits a substantial decrease in the size of the lamp 10 which is not unimportant in view of the fact that the maximum output which can be obtained from the device is ultimately limited by the heating of the film in case too large a light source is employed.

If desired, another cylindrical lens 28 may be employed as shown in Figure 3 as well as a pair of rollers 30 for guiding the film as it passes from one of the reels or coils 32 to the other.

It is understood that the photoelectric cells 18 will be connected to suitable indicating or recording devices so that the variations in electric current output corresponding to the width or density of the tracks 23 on the film strip can be used for any desired purpose.

As stated hereinbefore, the record tracks may be of uniform width and varying density, or of uniform density and varying width. Where used in the claims which follow the term "varying opacity" is intended to cover both of these forms.

Obviously many modifications and variations of the invention, as hereinbefore set forth, may be made without departing from the spirit and scope thereof, but only such limitations should be imposed as are indicated in the appended claims.

I claim:
1. A scanning device for converting parallel record tracks of varying opacity on a moving film strip into a number of correspondingly varying electric currents, which comprises a light source, a plurality of devices responsive to variations in light from said source, means for moving said film strip longitudinally across a beam of light from said source to said light-responsive devices, a mask containing a plurality of slits, each slit being disposed between said film strip and one of said light-responsive devices, an objective lens in the path of light emerging from said film strip, means for converging light from said source through the tracks on said film strip and onto said objective lens, said objective lens forming a real image of each record track in the plane of a corresponding slit, and a lens in the path of light emerging from each slit for converging said emerging light onto one of said light-responsive devices.

2. An apparatus for converting opaque record tracks of varying width on a moving film strip into correspondingly varying electric currents comprising a source of light, means for directing a beam of said light laterally through each track on the film strip to a light-responsive device corresponding to that track, said means consisting of a condensing lens for converging light from said source through said film strip to a focal point, an objective lens mounted at said focal point, a mask between said objective lens and said light-responsive devices, said mask containing a lateral slit in line with each of said light-responsive devices and said objective lens, and a converging lens disposed between each of said slits and its corresponding light-responsive device, the objective lens and one of said light-responsive devices being disposed at conjugate foci of each of said converging lenses.

3. An apparatus for converting opaque record tracks of varying width on a moving film strip into correspondingly varying electric currents comprising a source of light, means for directing a beam of said light laterally through each track on the film strip to a light-responsive device corresponding to that track, said means consisting of a convex, cylindrical lens, a spherical condensing lens for converging light from said source through said cylindrical lens and film strip to a focal point, said cylindrical lens being disposed with its longitudinal axis transverse to said film strip so as to focus the light emerging from said condensing lens into a line across the film, an objective lens mounted at a focal point of said condensing lens conjugate to said light source, a mask between said objective lens and said light-responsive devices, said mask containing a lateral slit in line with each of said light-responsive devices and said objective lens, and a converging lens disposed between each of said slits and its corresponding light-responsive device, the objective lens and one of said light-responsive devices being disposed at conjugate foci of each of said converging lenses.

ALEXANDER WOLF.

REFERENCES CITED

The following references are of record in the file of this patent:

UNITED STATES PATENTS

| Number | Name | Date |
|---|---|---|
| 2,272,795 | Dimmick | Feb. 10, 1942 |
| 1,734,248 | Eldred | Nov. 5, 1929 |